United States Patent [19]
Johnson et al.

[11] 3,811,020
[45] May 14, 1974

[54] SAFETY LOCK LEVER AND STARTING SAFETY SWITCH OPERABLE THEREBY

[75] Inventors: Robert W. Johnson, Winfield; George H. Waue, Arlington Heights; William R. Golden, Bloomingdale; Hugo O. Mosquera, Wheaton, all of Ill.

[73] Assignee: International Harvester Company, Chicago, Ill.

[22] Filed: Dec. 8, 1972

[21] Appl. No.: 313,311

[52] U.S. Cl............ 200/61.88, 74/850, 123/179 K, 180/82 A
[51] Int. Cl............................................ B60k 27/00
[58] Field of Search............ 200/61.91, 61.88, 50 C, 200/61.54; 74/483 R, 483 K, 850; 123/179 K; 180/82 A

[56] References Cited
UNITED STATES PATENTS

| 3,285,361 | 11/1966 | Baker | 123/179 K X |
|---|---|---|---|
| 1,735,542 | 11/1929 | Monday | 74/483 R |
| 2,848,988 | 8/1958 | Binder | 123/179 K |
| 3,242,280 | 3/1966 | Krieger | 200/61.91 |
| 3,574,288 | 4/1971 | Barth et al. | 123/179 K X |
| 2,867,131 | 1/1959 | Schroeder | 74/850 |

Primary Examiner—Robert K. Shaefer
Assistant Examiner—William J. Smith
Attorney, Agent, or Firm—John W. Gaines; Floyd B. Harman

[57] ABSTRACT

Safety lock lever for vehicles, particularly a lever movable to an on position in which it both electrically prepares the vehicle starter circuit for subsequent energization, and mechanically neutralizes the vehicle drive. In such a neutral-retaining position the lever is out of the way, and the driver can freely move about, both off and onto the vehicle. Equally significantly, the lever also has an off position in the way of the vehicle driver, as visible signal that the vehicle cannot be assumed safe to be dismounted from or entered or cranked.

1 Claim, 3 Drawing Figures

SAFETY LOCK LEVER AND STARTING SAFETY SWITCH OPERABLE THEREBY

This application relates to a safety lock lever for vehicles, particularly a lever movable to an on position in which it both electrically prepares the vehicle starter circuit for subsequent energization, and mechanically neutralizes the vehicle drive. Such preparation of the starter circuit by the lever is accomplished through a starting safety switch, included in circuit with the regular key controlled starter switch, and operated by the lever while the latter is in position retaining the drive in neutral.

In such neutral-retaining position the safety lock lever is out of the way and the driver can freely move about, both from and onto the vehicle. Equally significantly, the lever also has an off position in the way of a vehicle driver, as visible warning sign or signal that the vehicle cannot be assumed safe to be dismounted from or entered or cranked.

Several types of vehicle neutral switches are known. One type is switched and illuminates a transmission indicator light to signal that the vehicle is safe to be cranked. Another type actually prevents a cranked start until the vehicle transmission is in neutral. But the known transmission-setting-sensitive types have not been operated from a safety lock lever, and have the deficiency that the vehicle control is not locked thereby in neutral drive condition, or else the neutral condition is not signalled by means of a conspicuous visual signal, or both.

The safety lock lever and starting safety switch provided according to our invention cooperate in novel way overcoming the foregoing neutral switch deficiency, as will now be explained in detail. Features, objects, and advantages will either be particularly pointed out or become apparent when, for a better understanding of the invention, reference is made to the following description taken in conjunction with the accompanying drawings, which show a preferred embodiment thereof, and in which.

Figure 1:
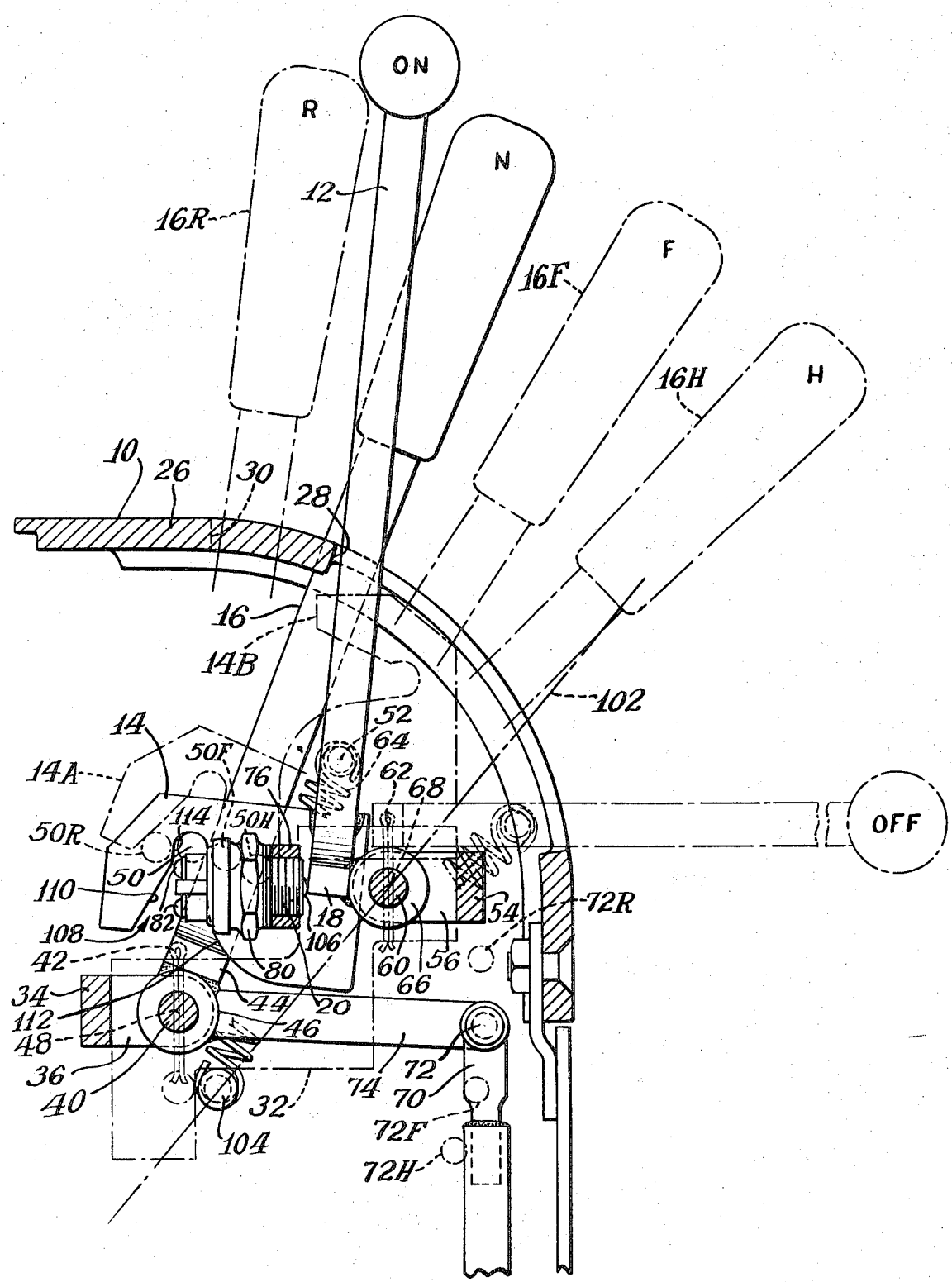
FIG. 1 is a view of the right side, in elevation, of a transmission control lever assembly embodying our invention.

One vehicle to which safety lock levers are particularly applicable is the crawler, especially one of which an upper flight of a crawler track must be negotiated by the driver in dismounting from or entering the crawler. It is obviously a hazard if such upper flight unwantedly moves while the driver is climbing across it for ingress or egress. By its position, the safety lock lever hereof signals to the driver whether or not the crawler transmission is blocked in neutral. Thus if the engine is to be crank started or left running, still no possibility exists of unwanted engagement of the transmission whereby the crawler will unexpectedly be set in motion.

In the example illustrated in the sheets of drawing, a transmission control lever assembly 10 includes a pivoted safety lock lever 12 which shiftably carries a cam block 14 made of thin plate. The block 14 as it shifts establishes cooperation with a forward-reverse lever or range shifter 16 which, according to the position of the lever 12, is either blocked or not blocked in neutral.

An integral, right angle bent lug on the safety lock lever 12 forms a switch actuator 18 which establishes cooperation with a starter circuit element or preparatory switch 20 in dependence upon the position of the lever 12.

While true, doubtless, to say it is safe to crank the engine while the shifter is precisely in neutral in a crawler, the truly safest condition is the instant one of cranking the engine when and only when the shifter is blocked in neutral. This condition is unmistakable herein. It is positively signalled by the position of the safety lock lever and, even better, no reliance is made on precisely detenting the shifter in neutral. That is to say, the customary transmission neutral detent is no safety device to begin with, and was never intended as such even when precisely centered and fully socketed.

The mere fact that a shifter appears to be in neutral does not mean it has reached neutral or is effectively retained in or near neutral. So it is important that jostling from the starting engine or from a hand or foot or some external force is positively forestalled herein, and the purpose is that at the critical time the shifter cannot be jostled out of a position blocked in neutral.

Supporting structure for the lever assembly 10 for the purposes above, includes a left sidebox 22 (FIG. 2) which, in one example of installation in a transmission-equipped, engine-powered vehicle, is at arm rest level at the left side of the driver's seat, not shown.

Vertical walls in the sidebox including a side plate 24, which is disposed in a longitudinal vertical plane, support a slotted quadrant 26 curving forwardly and downwardly and formed with first and second slots 28 and 30. The slots are parallel-disposed in separate longitudinal vertical planes. The first slot 28 receives and guides the pivoted lever 12. The second slot 30 receives and guides the shifter 16.

Figure 2:
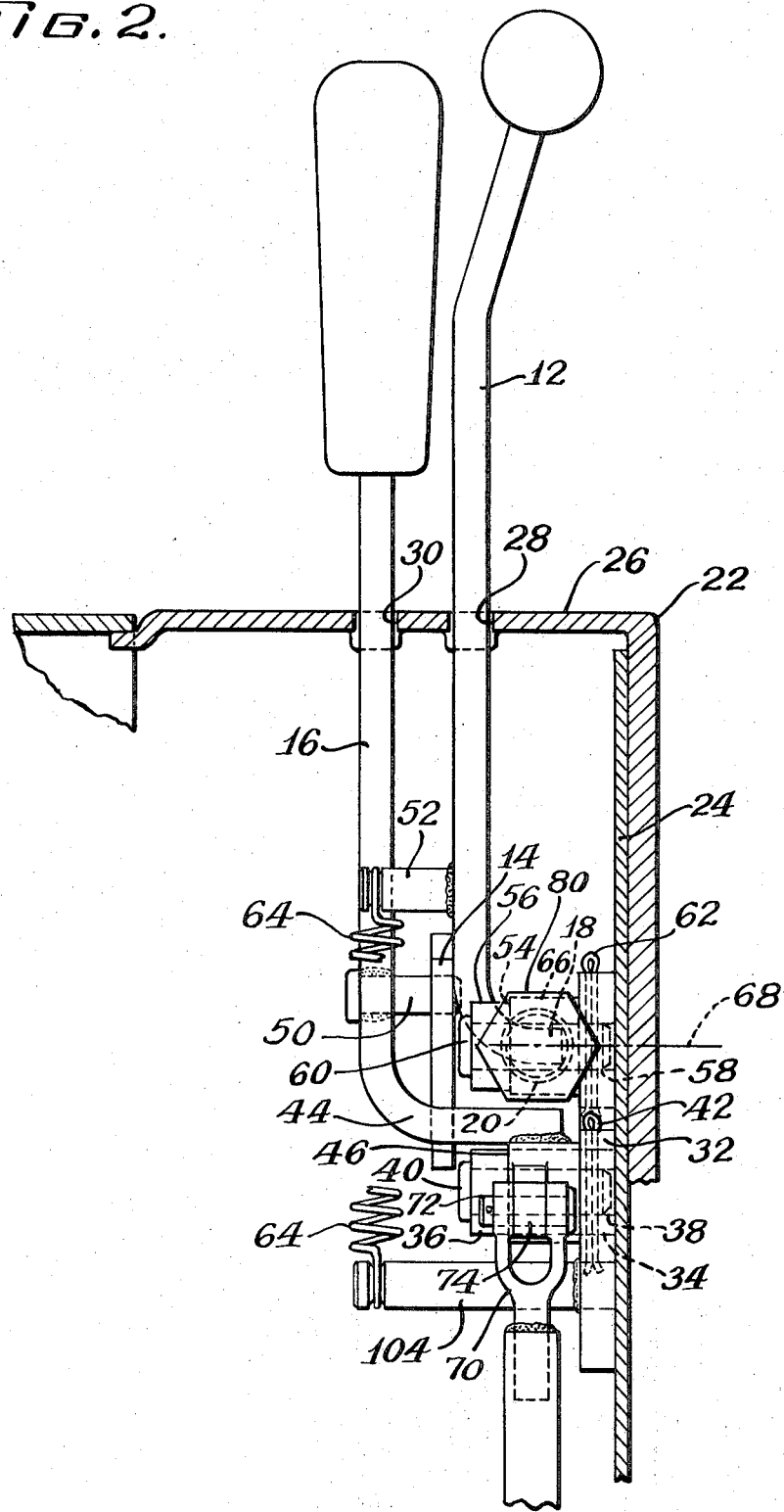
FIG. 2 is a rear elevational view.

SHIFTER PIVOT — FIGS. 1 and 2

An inside plate 32 secured to the side plate 24 carries an L-shaped bracket 34. A free end portion 36 of the bracket 34 has an opening which registers, to form a gap, in spaced apart relation with respect to a plate opening 38. A shifter pivot pin 40 fits in the registering openings so that its center section is exposed in the gap. The pin is secured in place by a removable cotter pin 42 passing through aligned openings in the inside plate 32 and inner end of the pin.

A 90° bent end 44 of the shifter 16 carries a bearing loop 46 which is received on the exposed center section of the pivot pin 40. The loop 46 is thus centered in its own plane, and cooperates with the pivot pin 40 in establishing for the shifter a fixed pivot axis 48 which is transversely disposed in the left sidebox 22.

Above and adjacent the bent end 44, the shifter 16 carries an affixed, medially extending pin forming a cam follower 50.

Figure 3:
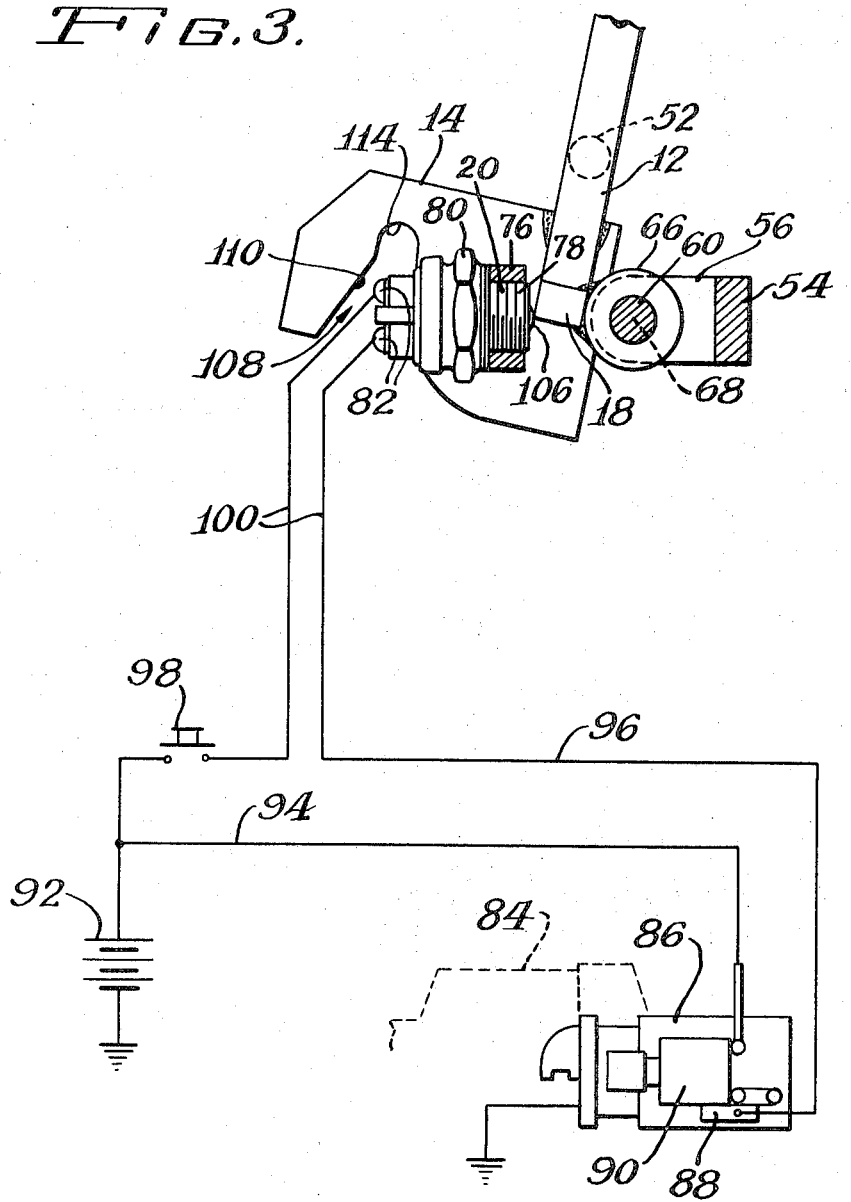
FIG. 3 is an elevational view similar to FIG. 1, but with parts omitted which are extraneous to safety switch operation.

LEVER PIVOT — FIGS. 1, 2 and 3

The safety lock lever 12 has an affixed overcenter spring stud 52 which extends laterally. Essentially the same as arranged with respect to the shifter, there are similarly arranged with respect to the lever 12 an L-shaped bracket 54, a free end portion 56 thereof, a plate opening 58, a lever pivot pin 60, and a cotter pin 62. A bottom-anchored overcenter spring 64 depends downwardly from the stud 52 to the anchor to control pivoting of the safety lock lever 12. Similarly, the lever 12 has arranged with respect thereto a bearing loop 66 and a fixed pivot axis 68. The axis 68 and the previously mentioned shifter pivot axis 48 are horizontal and parallel.

SHIFTER OPERATION — FIGS. 1 and 2

Although if desired in an alternative embodiment the second slot can be gated to afford driver feel by imparting separate planes in which the shifter 16 pivots about its fixed end, actually the second slot 30 in the illustrative embodiment confines the shifter 16 to a uniplanar arc of swing. In its movement from the solid line neutral position at an intermediate point in its arc, the shifter 16 can be moved into the forward range indicated by the handle position 16F as shown in broken lines or into the reverse range as indicated by the handle position 16R as shown in broken lines. In the handle position 16R of the lever, the lever 16 is adjacent the portion of the second slot 30 at its rear end (FIG. 1) in correspondence with a reverse setting of the transmission, not shown.

In the instance where the forward-reverse lever or range shifter 16 must be adapted for a power train having an additional speed, splitter box ratio (H), the second slot 30 and the shifter 16 can be modified to afford to the latter an additional handle position 16H. In that instance, the position 16H as indicated by broken lines will correspond to the high speed or high ratio condition of the power train, and the shifter 16 perforce will be adjacent the portion of the second slot 30 at an appropriately extended forward end, not shown.

A transmission-connected link 70 depends from a horizontal pivot 72 on the free front end of a shifter link 74 which is affixed at its rear to the referred to shifter bearing loop 46. The pivot 72 takes the solid line neutral position (FIG. 1) as dictated by the shifter in its neutral position. It also takes the respective other positions 72R, 72F, and 72H (if provided) indicated by broken lines and corresponding to the R position in the reverse range, and to the F and H (if provided) conditions in the power train, not shown.

The transmission itself, not shown, is conventional, employing the usual spring pressed ball detent which removably engages in various positions corresponding to the transmission range setting. The transmission also employs in customary manner a gear selector, not shown, which by operation of a gear box affords gear drive settings of an equal number for the transmission speeds offered, e.g., for a four-speed gear box in the transmission.

STARTER PREPARATORY SWITCH — FIGS. 1, 2, and 3

The inside plate 32 carries an affixed, transversely extending lug 76 (FIG. 3) which has a drilled and tapped switch hole 78 receiving a complementarily threaded, operating end of the switch 20. A hexagonal tool receiving enlargement 80 on the switch enables the operating end to be firmly seated under torque in the lug.

Remote from the operating end, the switch carries two electrical terminals 82 and, when operated, prepares a vehicle engine starter circuit now to be described.

STARTER CIRCUIT — FIG. 3

The vehicle has a crawler power train including an engine and power shift transmission unit 84 which, in the flywheel portion, carries a starter including a cranking motor 86 affording self starting to the engine. A cranking motor relay 88 operates a conventional starter solenoid 90 for energizing the motor 86 to start the engine.

A starter circuit includes a storage battery 92 connected by one main branch 94 therefrom to the contacts in the starter solenoid 90, and connected by a control circuit 96 through a starter switch 98 to the cranking motor relay 88. The preparatory switch 20 is in circuit with the starter switch 98, placed there by means of switch connections 100 interposing the two switch terminals 82 at a point between the starter switch 98 and the relay 88 controlled thereby.

In independent ways now to be discussed, the lever 12 interacts respectively with the previously mentioned overcenter spring 64, the switch 20, and the shifter 16.

TWO POSITION LEVER 12 — FIG. 1

The safety lever 12 is unstable when brought into a position, not shown, at the point at which the overcenter spring stud 52 thereon is brought into alignment with a reference centerline 102 passing through the fixed pivot axis 68 and an overcenter spring anchor 104 which is fixed close to and beside the shifter pivot pin 40. The overcenter spring 64 at that point will be stretched its maximum length between the stud 52 and the anchor 104, leaving the lever poised to swing either way. When the lever 12 is above the centerline 102 as viewed in FIG. 1, bias from the contacting overcenter spring will move the lever and retain it in an on position as shown in the upwardly directed solid lines. When the lever is below the centerline 102, the bias will move it and retain it in an off position as shown in the horizontally directed broken lines. The significance of the two terms on and off is that when the safety lever is "on," then the tractor is incapable of power movement and, when the lever is "off," the tractor has the potential of continuing or of reversing movement, or of starting movement any time under power.

GEOMETRY

Relative to the horizontal shifter pivot axis 48, the cam block pivot axis 68 has a slight forward and vertical offset therefrom horizontally and upwardly, respectively. So the cam block 14 and the shifter 16 are, even at the extreme, closely adjacent when pivoted into their vertical broken line positions above their pivots as indicated by the broken lines, respectively, 14B and R. Then, when pivoted toward one another, the cam follower 50 of the shifter 16 moves relative to the cam block 14 through a locus of points horizontally aligned with one another and with the pivot axis 68 and forming essentially a flat arc across the terminal portion of the path of the cam plate 14. At the same time the cam block 14 in its aforesaid terminal portion of its path of swing passes through a locus of points vertically aligned with one another and with the pivot axis 48, and forming essentially a flat arc above axis 48.

CIRCUIT PREPARATION — FIGS. 1, 2, and 3

When the lever 12 extends forwardly in its off position as indicated by broken lines in FIG. 1, closure of the starter switch 98 is of no effect because the control circuit 96 is incapacited by the preparatory switch 20 which is open.

But the operator by lifting the safety lever 12 with his left hand can move the lever 12 into the solid line on-position wherein the switch actuator 18 on the lever engages a ball forming the operating button 106 at the operating end of the preparatory switch 20, and causes the contacts of the switch 20 to be held closed. The control circuit 96, by reason of the presence of the switch connections 100, thereafter stands prepared for subsequent operation of the circuit by the starter switch 98 to energize the cranking motor 86.

NEUTRALIZATION —FIGS. 1, 2, and 3

The cam follower 50 carried by the shifter 16 has the foregoing described short path of horizontal movement, defined respectively by the solid line position which it takes as shown in FIG. 1 and by the broken line positions 50R and 50F corresponding to the referred to neutral, reverse, and forward positions of the range shifter 16. A generally V-shaped gap 108 in the lower edge of the cam block 14 overlies the path of the cam follower 50, as seen when the block is immediately thereabove in the broken line, generally horizontal position as shown by the broken lines 14. The V-gap 108 is defined by a straight cam 110 at one side of the V, an upwardly converging convex curved cam 112 at the other side, and a small semicircular culdesac or pocket 114 at the converged upper end of the V.

At the time at which the operator raises the pivoted safety lock lever 12 from the off position to the vertical on-position, the cam follower 50 on the shifter 16 will, if it occupies the solid line neutral position as shown in FIG. 1, be straddled by the downcoming cams 110 and 112 at the sides of the V-gap 108. Consequently, as the cam block 14 takes its terminal, horizontal position, the shifter follower 50 will be received in the pocket 114 so as to be blocked from movement either way out of neutral.

Or if the cam follower 50 at the time occupies the reverse position 50R, it will be cammed by the oncoming straight cam 110 and deflected into a blocked position in the pocket 114, the follower thus holding the shifter 16 from movement out of neutral.

Or if the cam follower 50 at the time is in the broken line forward position 50F, it will be cammed by the downcoming curved cam 112 and deflected into the pocket 114 with the same result that the shifter 16 is blocked in neutral.

OPERATION

At point of engine start-up, the positions of the shifter 16 and the gear selector, not shown, go unheeded by the driver, with no attendant safety hazard. Let it be assumed the operating cycle begins under the circumstances that the shifter is in the reverse range and the gear selector is set for the second speed. At that point, the driver noting that the lever 12 is not in the upright on-position will see to raising it to on-position to prepare for cranking. After appropriately setting the engine fuel control, not shown, the driver cranks up by temporarily closing the starter switch 98 and thereafter resetting the fuel adjustment after the engine is running. The driver then swings the lever 12 forwardly to the horizontal off-position, releasing the shifter from its blocked-in position where it was being held in neutral.

By setting the gear selector, not shown, in the desired speed setting and subsequently setting the direction of vehicle movement by moving the shifter 16 out of neutral position, the driver sets off in the vehicle for a day's operation. When the operation is over and the engine is to be stopped, the driver raises the lever 12 to the upright on-position just before or just after shutting down the engine.

The operating cycle is then repeated.

It will be appreciated that the safety lever 12, the transmission range shifter 16, and the circuit preparing switch 20 which is also termed a neutral safety switch, interact in novel foolproof manner, all in a sidebox convenient to lateral hand movement by the driver. With safety thus assured against the transmission being jostled into drive while the engine is running and against the engine being cranked with the transmission engaged for drive, the balance of the vehicle controls can be conventional with no hazard. The starter switch 98 is placed in customary position on the instrument panel, not shown, and is either key controlled in combination with an engine ignition switch if provided, or key or otherwise controlled independently.

It will be appreciated that the cam block 14 can be appropriately modified by widening the gap 108 so as to accommodate an additional position of the cam follower such as the high range position, if such is provided as indicated by the broken lines 50H. The neutralization and blocking will be the same as described for the three-position shifter, except that four positions will be involved instead of only three.

Variations within the spirit and scope of the invention described are equally comprehended by the foregoing description.

What is claimed is:

1. A safety device for use with a self-starter vehicle which is power driven, comprising:
    an electrical system including a starter switch circuit with plural elements therein to do the cranking necessary for self-starting;
    a shift blocking member;
    a cooperating shifter for controlling transmission of power to drive the vehicle, and operatively blockably related to the shift blocking member so as to be restrained from operating positions when blocked in neutral by said member;
    means supporting said member and shifter in the operative relationship described;
    said shift blocking member operator-pivoted into a pivoted position to unblock the shifter; and
    a switch circuit element engaged by said member in the unpivoted position whereby to actuate said switch circuit element in the starter switch circuit only when the shifter is blocked in neutral;
    said member having:
    a cam connected thereto effective, when the member is returned to unpivoted position, to cam the shifter from a particular position, not neutral, into the neutral position and thereupon to block same.

* * * * *